(12) United States Patent
Takahashi

(10) Patent No.: US 6,463,152 B1
(45) Date of Patent: Oct. 8, 2002

(54) DIGITAL BROADCAST RECEIVING AND REPRODUCING APPARATUS

(75) Inventor: Masayuki Takahashi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/257,740

(22) Filed: Feb. 25, 1999

(30) Foreign Application Priority Data

Feb. 25, 1998 (JP) .......................................... 10-043223

(51) Int. Cl.[7] .......................... H04N 7/167; H04K 1/00
(52) U.S. Cl. ......................................... 380/201; 705/57
(58) Field of Search .............................. 380/239, 201, 380/203, 210, 212, 227, 230, 231, 233; 705/52, 57

(56) References Cited

U.S. PATENT DOCUMENTS 5,991,400 A * 11/1999 Kamperman ................ 380/239
6,282,293 B1 * 8/2001 Itoh et al. ................... 380/233

FOREIGN PATENT DOCUMENTS

JP          9-93561          4/1997

* cited by examiner

*Primary Examiner*—Matthew Smithers
(74) *Attorney, Agent, or Firm*—RatnerPrestia

(57) ABSTRACT

A digital broadcast receiving and playing apparatus for receiving digital program data of pay broadcast, generating an apparatus individual key and a program key different in every program or every program division of a divided program in the receiving and playing apparatus, recording after scrambling the program data and program key by the apparatus individual key, controlling the number of times of display of program data received or played from memory device, thereby capable of prohibiting reproduction or display of program data more than the permitted number of times.

4 Claims, 10 Drawing Sheets

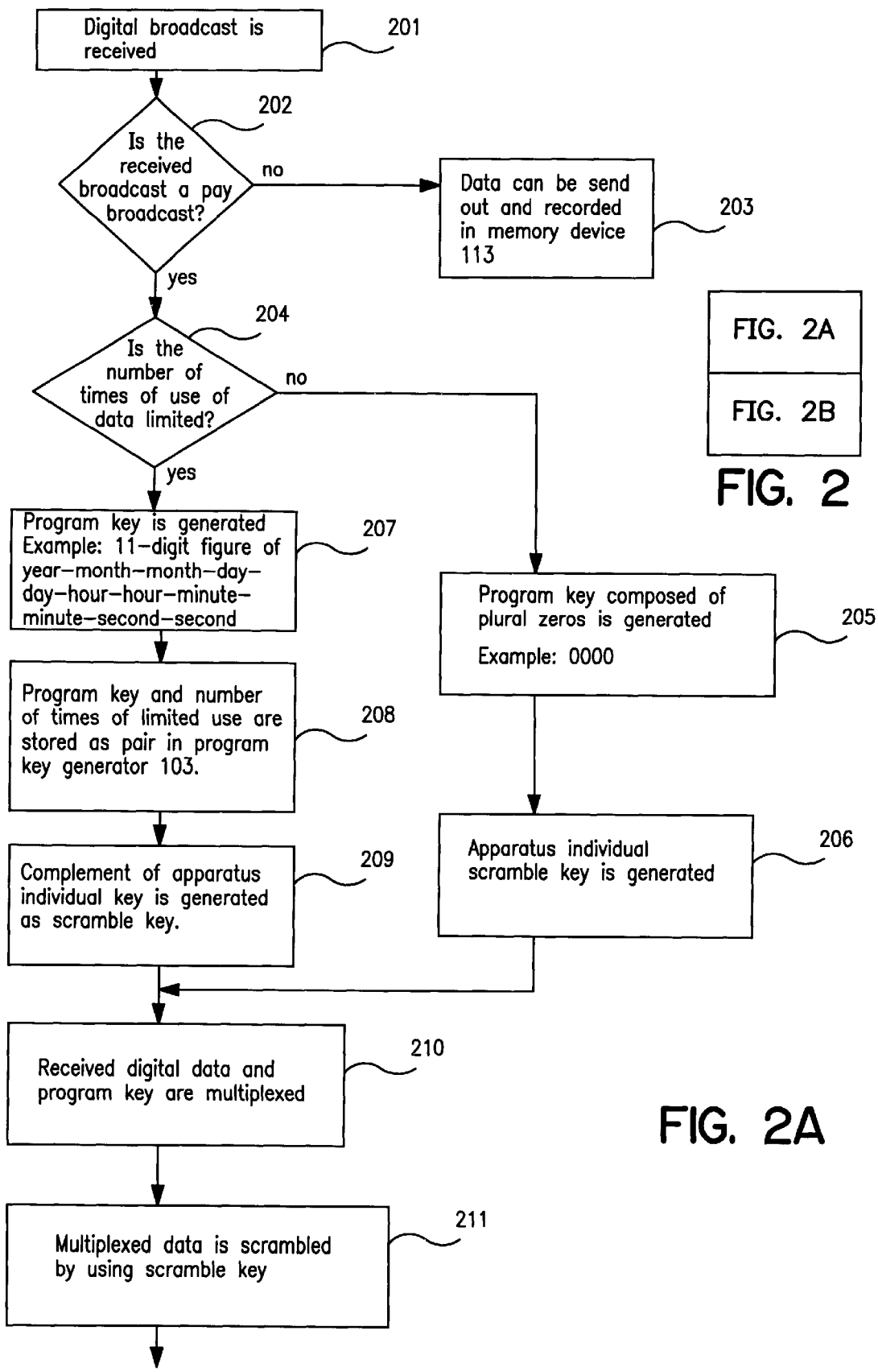

DIGITAL BROADCAST RECEIVING AND REPRODUCING APPARATUS

BACKGROUND OF THE INVENTION

The present invention relates to a digital broadcast receiving and reproducing apparatus having a function of protecting the copyright by preventing unauthorized viewing or copying of digital broadcast.

A digital broadcast receiving and reproducing apparatus according to a prior art is disclosed, for example, in Japanese Laid-open Patent No. H9-93561.

FIG. 8 is a block diagram of digital broadcast receiving and reproducing apparatus of prior art.

This receiving and reproducing apparatus comprises a smart card (ID card) 804 storing a copy protection control code for judging permission of reception of broadcast, a digital VCR 805 recording digital data, and a digital broadcast receiver 801. The digital broadcast receiver 801 includes a descrambler 802 for canceling the scramble coded into program data, and a recording and digital output controller 803 for generating and issuing digital data and copy protection control code. The digital VCR 805 is connected to the receiver 801 through data input and output ports and provided with control signals for input and output data and erasing data recorded in tape.

In the digital broadcast receiving and reproducing apparatus according to such prior art, as the memory device of digital data, it is expected to be developed not only into the digital VCR, but also into magnetic disk device, write once type magneto-optical disk device, and rewritable magneto-optical disk device. Moreover, there is an increasing demand for digital broadcast receiving and reproducing means for pay broadcast and/or pay-per-view, capable of protecting the copyright of the broadcast program by allowing only the subscribers to reproduce in ordinary pay broadcast or allowing to reproduce only once in pay-per-view, and without recording the copy protection control code, which is the key of broadcasting system, in the recording medium so as to be high in hacking resistance.

SUMMARY OF THE INVENTION

To solve the problems, the digital broadcast receiving and reproducing apparatus of the invention is a digital broadcast receiving and reproducing apparatus for receiving digital broadcast, demodulating received digital data, and taking out analog signal and copy protection information from the digital data, which comprises an apparatus individual key generator for generating and storing an individual key for the receiving and reproducing apparatus, a program key generator for generating a program key for every received program and storing this program key and the number of times of limited use in the copy protection information, a scrambler for multiplexing the program key and the demodulated digital data and scrambling by the apparatus individual key, a record judging unit for judging permission of recording of the scrambled digital data, and a digital data memory device for recording digital data through the record judging unit.

This digital broadcast receiving and reproducing apparatus further comprises a descrambler for descrambling the scrambled digital data reproduced from the memory device by using the apparatus individual key, extracting the program key from the scrambled digital data, and comparing the extracted program key and the program key stored in the program key generator. The digital broadcast receiving and reproducing apparatus of the invention is characterized by determining permission of output of digital data from the number of times of limited use and the result of the comparison.

Thus scrambled video and audio data can be reproduced, in the case of ordinary pay broadcast, only in the apparatus used for receiving or can be reproduced by the specified number of times in the apparatus used for receiving only, or in the case of pay-per-view, it is permitted to reproduce once only in the received apparatus. In this way, the key of the broadcast system, that is, the copy protection control code is not sent out of the receiving and reproducing apparatus, it has a high resistance to hacking, and not limited to the digital VCR, the digital broadcast receiving and reproducing apparatus is applicable to other recording device such as magnetic disk device, write once type magneto-optical disk device, or rewritable magneto-optical disk device.

BRIEF DESCRIPTION OF THE INVENTION

Figure 5A:
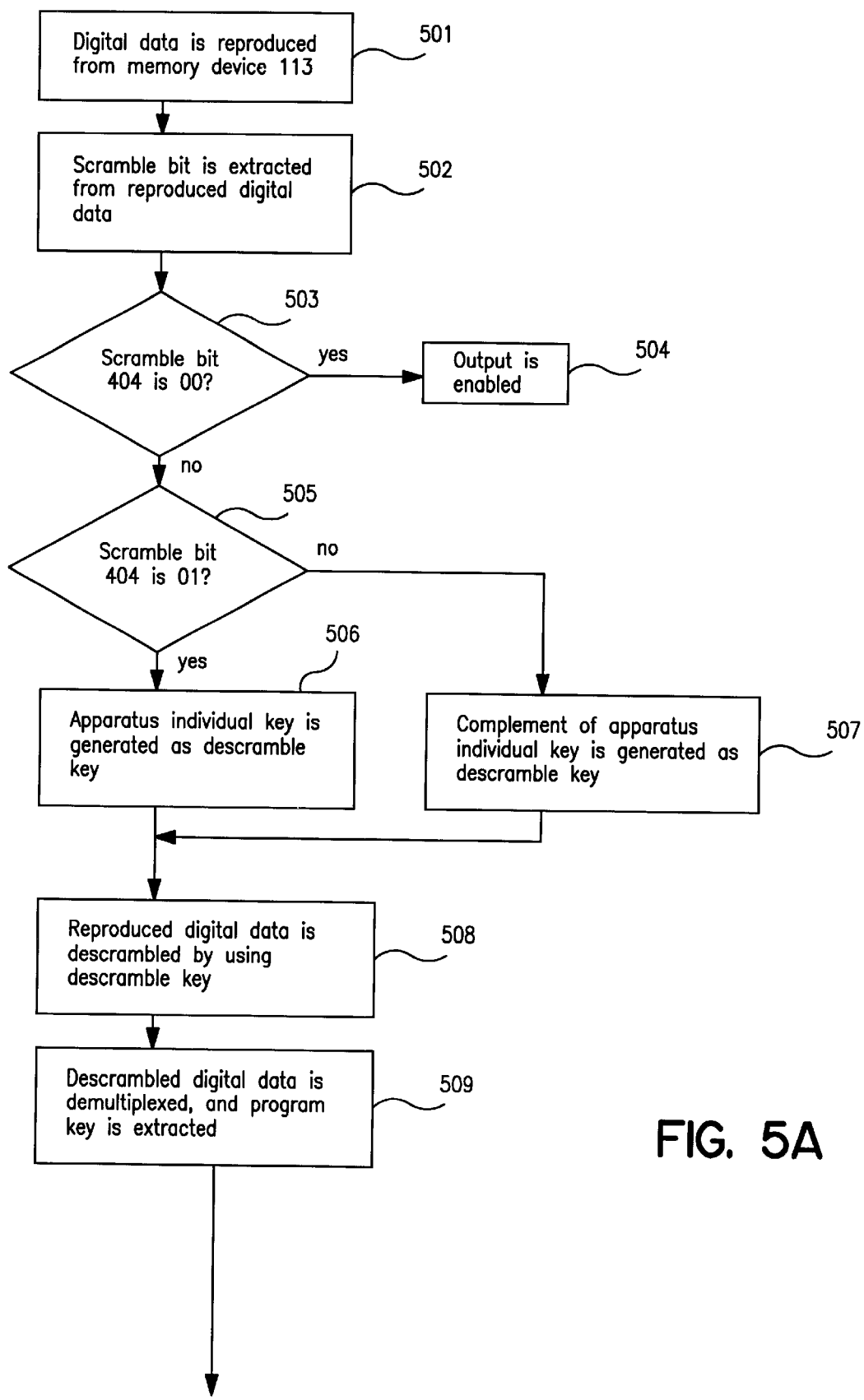
Figure 5B:
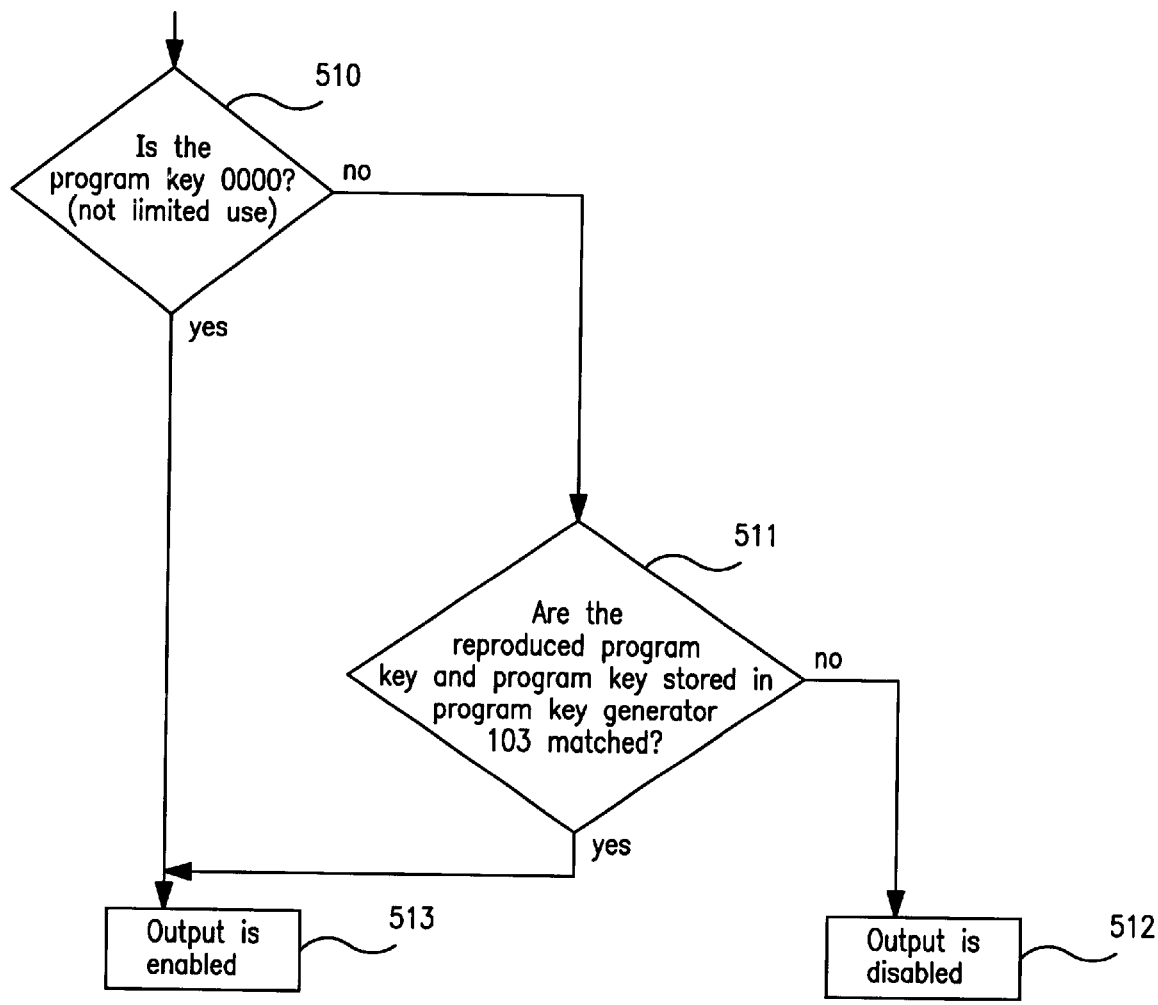

FIG. 5 is a flowchart showing a permission judging procedure of output of digital data reproduced from the digital data memory device 113 into a video and audio output device 112 in embodiment 1 of the invention.

Figure 6:
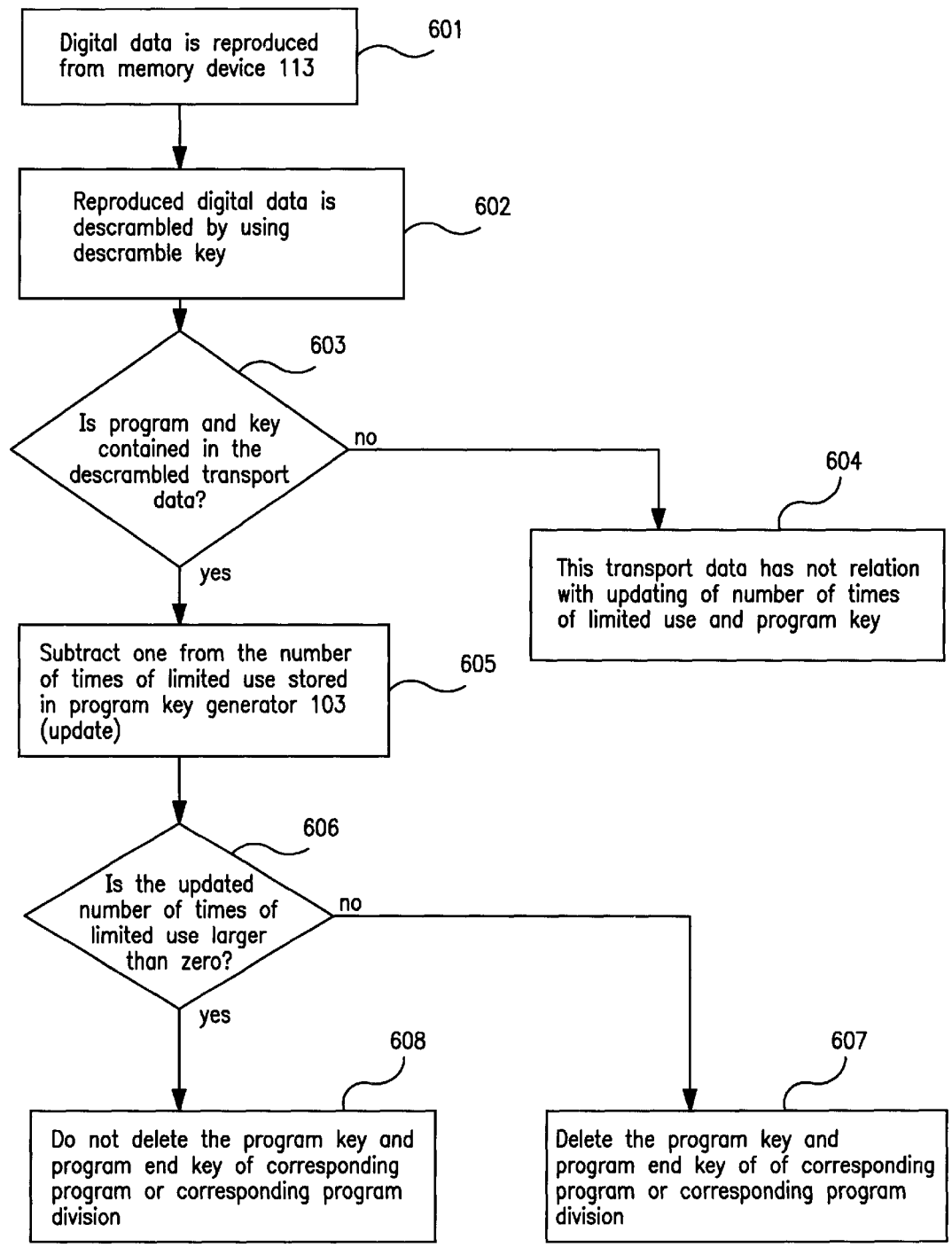

FIG. 6 is a flowchart showing an updating procedure of the number of times of limited use and program key when reproducing data from the digital memory device 113 in embodiment 1 of the invention.

Figure 7:
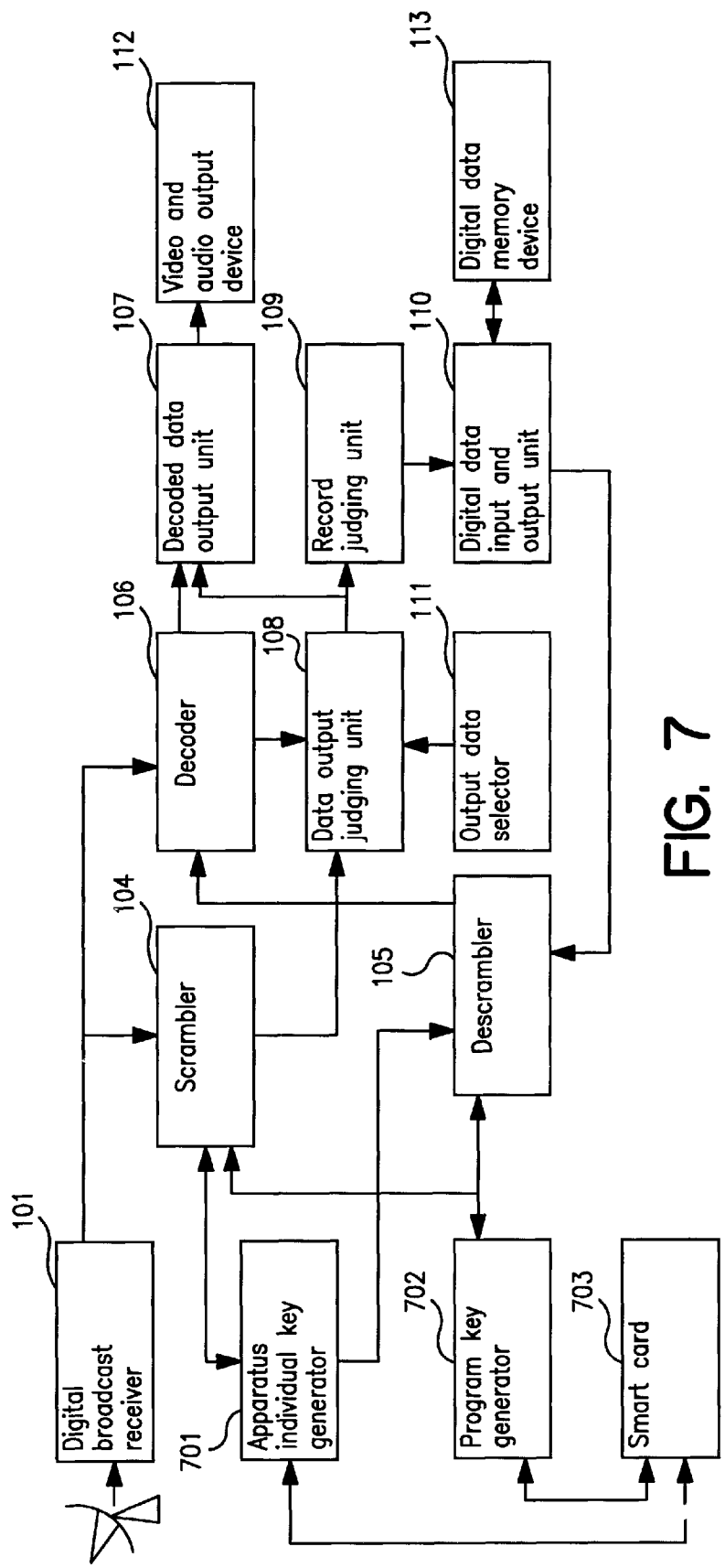

FIG. 7 is a block diagram of a digital broadcast receiving and reproducing apparatus in embodiment 2 of the invention.

Figure 8:
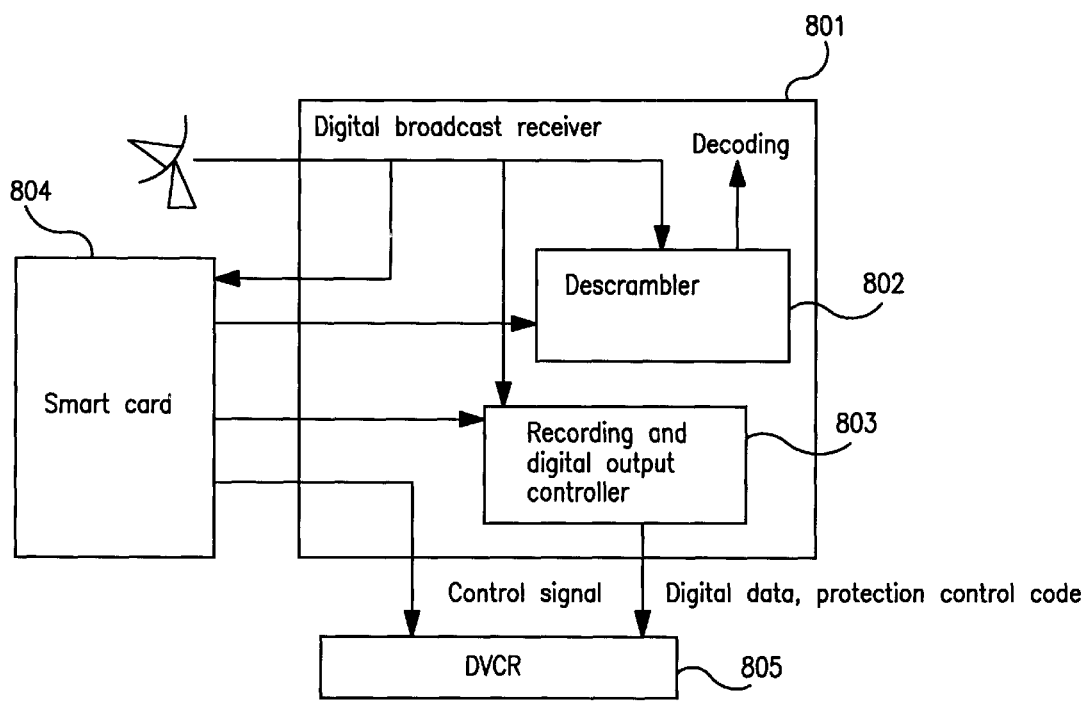

FIG. 8 is a block diagram of a digital broadcast receiving and reproducing apparatus in prior art.

DETAILED DESCRIPTION OF THE INVENTION

Exemplary Embodiment 1

A first embodiment of a digital broadcast receiving and reproducing apparatus of the invention is described below while referring to FIG. 1, FIG. 2, FIG. 3, FIG. 4, FIG. 5, and FIG. 6.

Figure 1:
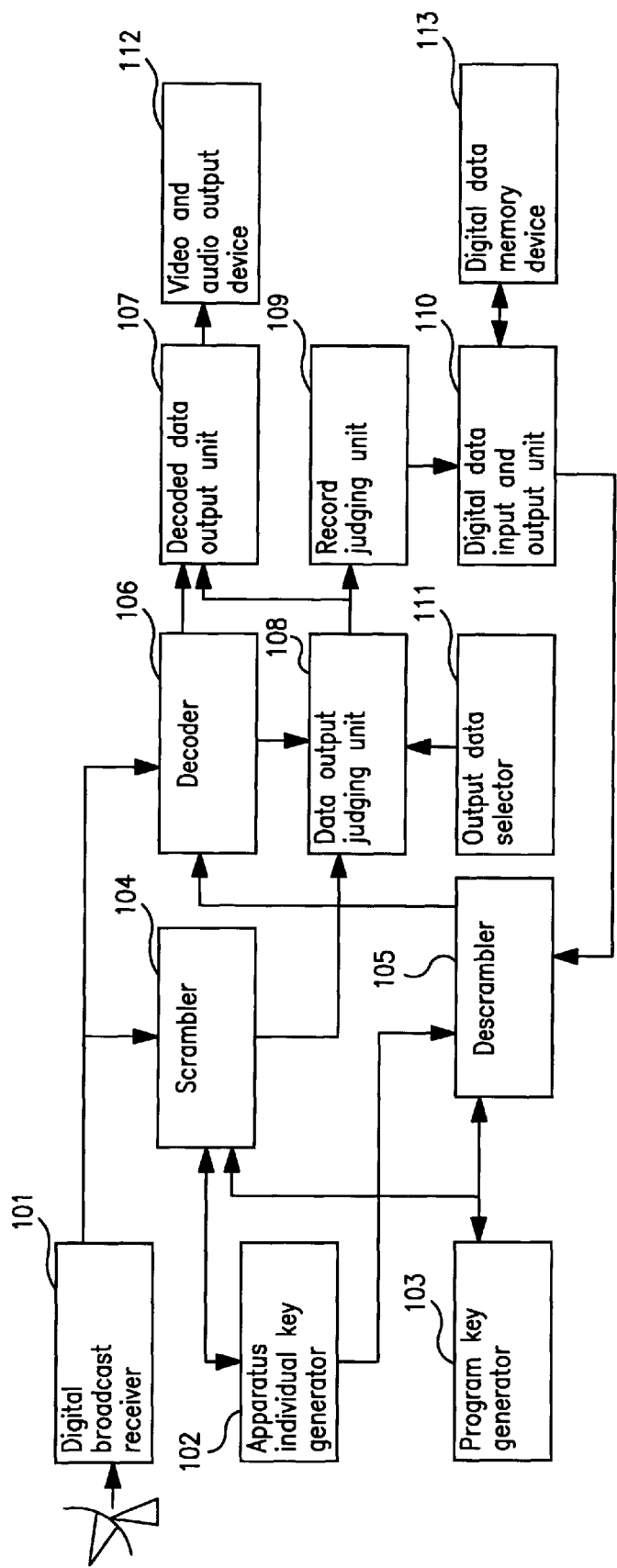
FIG. 1 is a block diagram of a digital broadcast receiving and reproducing apparatus in embodiment 1 of the invention.

In FIG. 1, a digital broadcast receiver 101 receives digital broadcast, and picks up copy protection information, further demultiplexes plural programs transmitted in multiplexed form to pick up a program signal designated by the user, descrambles, if necessary, digital data by using a descramble key in the copy protection information, and takes out digital audio and digital video data.

A decoder 106 decodes digital audio data and/or digital video data when receiving or reproducing, converts into analog video signal and/or analog audio signal, and sends out to a data output judging unit 108.

An apparatus individual key generator 102 generates and stores a scramble key for scrambling when sending the received digital data to the digital data memory device 113, and a descramble key for descrambling the signal issued from the memory device 113. The scramble key and descramble key are apparatus individual keys assigned in every apparatus. A program key generator 103 generates a different program key for every program by using the time information contained in the received digital data, and stores this key and the number of times of limited use in the copy protection information received in the receiver 101 in pair. Time information may be also obtained from a clock incorporated in the apparatus.

A scrambler 104 multiplexes digital audio data and digital video data sent from the receiver 101 and program key sent from the program key generator 103, further scrambles this multiplexed digital data by the scramble key issued from the apparatus individual key generator 102, and transfers it to a data output judging unit 108. An output data selector 111 selects only one of the three as the type of output data, that is, only the decoded data, only digital data, or both of them.

When the selector 111 selects only the decoded data, the data output judging unit 108 transfers the decoded data to a decoded data output unit 107.

Or when the selector 111 selects only the digital data, the data output judging unit 108 transfers the digital data to a record judging unit 109.

Further, when the selector 111 selects both the decoded data and digital data, the data output judging unit 108 transfers the decoded data to the decoded data output unit 107 and the digital data to the record judging unit 109.

The record judging unit 109 judges permission of recording by comparing the number of times of limited use in the copy protection information received in the receiver 101 and the number of types of data selected and issued by the data output judging unit 108. If recording is possible as a result of judging, the scrambled digital data is transferred to a digital data input and output unit 110. The decoded data output unit 107 protects analog data with generation management information, which is analog copy protection, for example, a copy protection of Macrovision Co., and sends analog audio signal and/or analog video signal to a video-audio output device 112. The digital data input and output unit 110 sends the scrambled digital data sent from the record judging unit 109 to a memory device 113. Further, this input and output unit 110 also transfers the scrambled digital data regenerated from the memory device 113 to the descrambler 105.

The descrambler 105 descrambles the scrambled digital data sent from the input and output unit 110 by the descramble key from the apparatus individual key generator 102, and takes out the program key and digital audio and digital video data.

Further, the descrambler 105 compares the program key taken out from the descrambled digital data, and the program key stored in the program key generator 103, confirms the coincidence of the two keys, judges permission of reproduction depending on the result of comparison and the number of times of limited use, and, if permitted to reproduce, transfers the descrambled digital data to the decoder 106. The decoder 106 decodes the digital data reproduced from the digital data memory device 113, and converts into analog video signal and/or analog audio signal, and sends the data to the decoded data output unit 107.

Figure 2B:
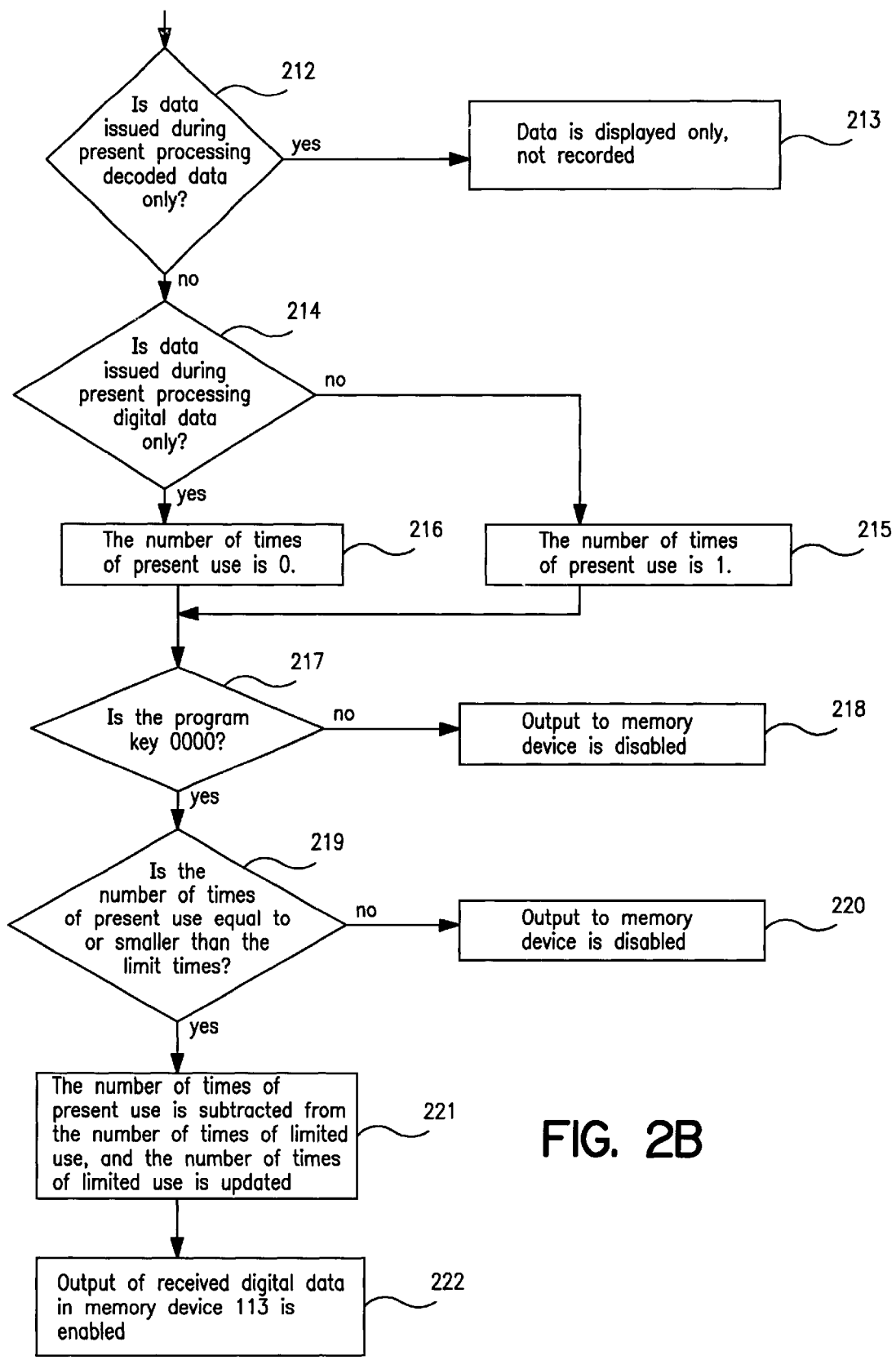
FIG. 2 is a flowchart showing a permission judging procedure of output of digital data to a digital memory device 113 in embodiment 1 of the invention.

The procedure of issuing the digital data received in the receiver 101 to the memory device 113, and judging permission of memory is explained below while referring to FIG. 2.

The receiver 101 receives a digital broadcast program, and issues the received digital data (step 201), the scrambler 104 checks if the received program is a pay broadcast or not (step 202), and if the checking result is free broadcast, the digital data can be recorded in the memory device 113 (step 203), or in the case of a pay broadcast, the scrambler 104 checks if the number of times of use of the digital data is limited or not (step 204).

The limitation of the number of times of use is judged by the number of times of limited use mentioned in the copy protection information in the digital data. As a result of checking, if the number of times of use is not limited, the program key generator 103 generates plural zero bit rows, for example, 0000 as the program key (step 205), and the apparatus individual key generator 102 generates the individual scramble key for the apparatus (step 206). As a result of checking at step 204, if the number of times of use is limited, the program key generator 103 generates a different program key for every program. The program keys must be set individually so as not to be duplicated, and, for example, an eleven-digit figure showing the time may be used, that is, year-month-month-day-day-hour-hour-minute-minute-second-second (step 207).

The program key generator 103 stores the program key and the number of times of limited use in pair (step 208), and the apparatus individual key generator 102 generates a complement of apparatus individual key as scramble key (step 209).

The scrambler 104 multiplexes digital data of pay broadcast or free broadcast and program key (step 210), and scrambles the multiplexed digital data by using each scramble key (step 211).

Consequently, the data output judging unit 108 judges if the type of the output data designated by the user through the selector 111 is decoded data only or not (step 212), and in the case of decoded data only, the received digital data is decoded and issued to the display device, and there is no output to the recording device (step 213), and otherwise the data output judging unit 108 judges again whether digital data only or not (step 214), and in the case of digital data only, the scrambler 104 sets 0 as the number of times of present use which is the number of times of use of data during the present processing (step 216), and in the case of not digital data only, that is, both digital data and decoded data are judged, the scrambler 104 sets 1 as the number of times of present use (step 215).

Next, the scrambler 104 judges whether the program key is 0000 or not (step 217), and if not 0000, such digital data is prohibited from being issued to the memory device 113 (step 218), and if the program key is 0000, the scrambler 104 judges if the number times of present use is smaller than or equal to the number of times of limited use (step 219).

If not smaller as a result of judging, such digital data is prohibited from being issued to the memory device 113 (step 220), and if smaller, the program key generator 103 subtracts the number of times of present use from the number of times of limited use, and updates the result as a new number of times of limited use (step 221), and such digital data is issued to the memory device 113 (step 222).

Figure 3:
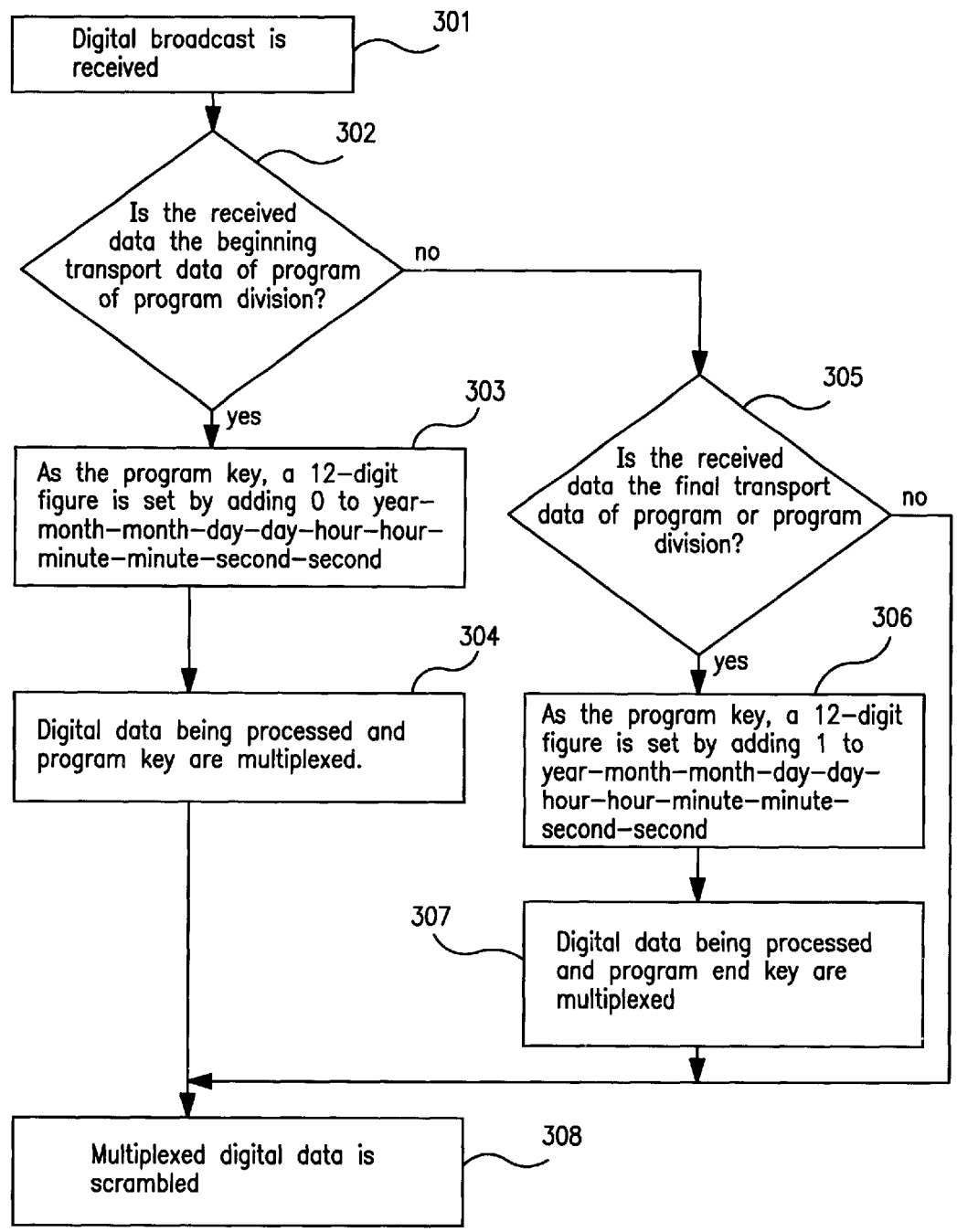
FIG. 3 is a flowchart showing generation of program key and multiplexing process of generated key and digital data in embodiment 1 of the invention.

In the event of limitation in the number of times of use, generation of program key and program end key, and scrambling and multiplexing process of the generated keys are described in detail below while referring to FIG. 3.

As for the program key, meanwhile, either one same key is defined throughout one program, or different program keys are defined for each program division which are generated by dividing one program into plural divisions in every specified time (for example, every 5 minutes).

The receiver 101 receives a digital broadcast program, and issues the received digital data (step 301).

The scrambler 104 checks if the digital data being received and processed at the present is beginning transport data of program or program division, or not (step 302), and in the case of beginning transport data, the program key generator 103 generates the program key different in every program which is, for example, a twelve-digit figure added zero to the end of the time code consisting of year-month-month-day-day-hour-hour-minute-minute-second-second, and generates (step 303), and the scrambler 104 multiplexes this program key and the digital data being processed (step 304).

As a result of checking, if not beginning transport data, the scrambler 104 checks if the digital data being processed is final transport data of program or program division, or not (step 305), and if final, the program key generator 103 generates a different program end key in every program or every program division. The program end key should be set so as not to duplicate, and to be stored in pair with the program key, and, for example, a twelve-digit figure may be used by adding 1 to the end of the time code consisting of year-month-month-day-day-hour-hour-minute-minute-second-second (step 306).

Further, the scrambler 104 multiplexes the program end key and digital data being processed (step 307).

The scrambler 104 scrambles by exclusive OR operation of digital data multiplexed with program key or program end key, or non-multiplexed digital data, with the scramble key (step 308).

The data structure of received digital data is specifically described below while referring to FIG. 4.

The digital data taken out by the receiver 101 is a group of transport data 401. The transport data 401 consists of a header 402 for storing information of data, and a payload 403 for storing audio and video data.

The header 402 includes a scramble bit 404 of two bits for storing information of scramble, and private data 405 of variable byte length capable of storing original data.

In the scramble bit 404, specifically, 00, 01 or 10 is stored in order to distinguish non-pay broadcast program, that is, non-scrambled program, and pay broadcast program, that is, scrambled program not limited in the number of times of use and scrambled program limited in the number of times of use.

In the private data 405, program key or program end key is stored. The method of storing is as follows. The program key generator 103 creates transport data showing program end key or program key, the scrambler 104 stores the transport data of the program end key in the final private data 405 of program or program division, and stores the transport data of program key in the beginning private data 405 of program or program division.

Figure 4:
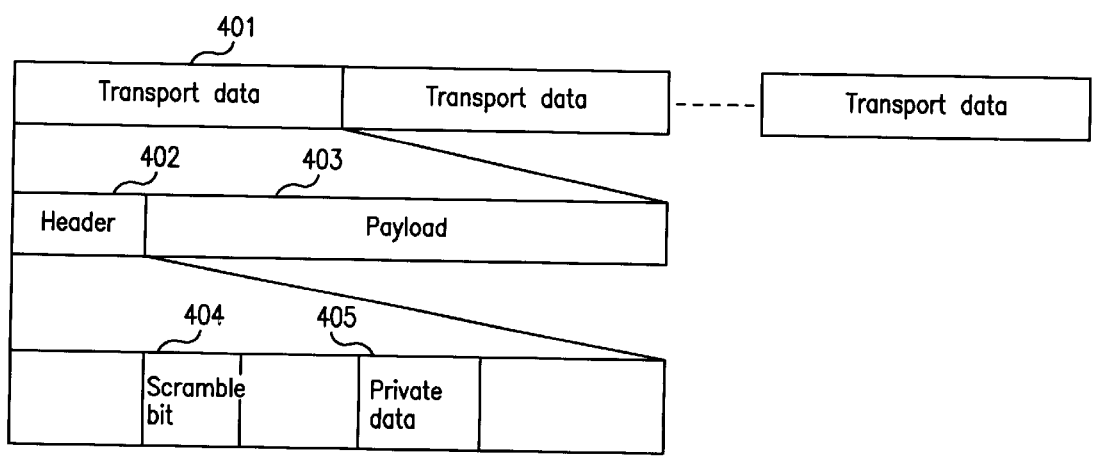
FIG. 4 is a structural diagram of digital data in embodiment 1 of the invention.

In the front and rear blanks of the scramble bit 404 and private data 405 in FIG. 4, flags and data are stored, but since they are not related to the invention, their description is omitted.

Scrambling is applied to the subsequent data excluding the scramble bit 404 of the transport data 401.

Next, the procedure of judging permission of output of the digital data reproduced from the memory device 113 into the video and audio output device 112 is described while referring to FIG. 5.

First, by the control of the input and output unit 110, digital data is reproduced from the memory device 113 (step 501).

The descrambler 105 extracts the scramble bit 404 from the reproduced digital data (step 502), and checks whether the digital data is free broadcast or not, that is, whether the scramble bit 404 is 00 or not (step 503).

If the result of checking is free broadcast, that is, 00, the digital data can be issued to the video and audio output device 112 (step 504).

On the other hand, if the result of checking is pay broadcast, that is, other than 00, the descrambler 105 checks again whether the number of times of use of the digital data is limited or not, that is, whether the scramble bit 404 is 01 or not (step 505).

If the result of checking is not limited, that is, 01, the descrambler 105 generates an apparatus individual key as the descramble key (step 506), and if limited, the descrambler 105 generates a complement of the apparatus individual key as the descramble key (step 507).

Consequently, using the generated descramble key, the descrambler 105 descrambles the reproduced digital data (step 508), and further demultiplexes the descrambled digital data, and extracts a program key (step 509).

The descrambler 105 checks the extracted program key, and checks if the digital data is limited in the number of times of use or not, that is, whether the program key is 0000 or not (step 510).

As a result of checking, if the number of times of use is not limited, such digital data can be issued (step 513), and if limited, the descrambler 105 compares the regenerated program key and the program key of the program stored in the program key generator 103, and checks whether two are matched or not (step 511).

If not matching, output of the digital data is prohibited (step 512), and if matching, output is permitted (step 513).

Referring now to FIG. 6, the updating process of the number of times of limited use and the program key is described below, that is, when reproducing the digital data limited in the number of times of use, the number of times of limited use stored in the program key generator 103 is decreased, and the program key is erased as required.

First, by the control of the input and output unit 110, digital data is reproduced from the memory device 113 (step 601).

The descrambler 105 descrambles the reproduced digital data by using the descramble key (step 602).

The descrambler 105 checks whether program end key is provided or not in the transport data of the descrambled digital data (step 603). As a result of checking, when there is no program end key in the transport data, if the transport data is used, it is not necessary to update the number of times of limited use and the program key (step 604), and when program end key is present, 1 is subtracted from the number of times of limited use stored in the program key generator 103, and the value is stored newly in the program key generator 103 as the updated number of times of limited use (step 605).

The descrambler 105 checks whether the updated number of times of limited use is larger than zero or not (step 606), and if the number of times of limited use is not larger than zero, the program key generator 103 deletes the program key and program end key of the pertinent program or the pertinent program division (step 607), and if the number of times of limited use is larger than zero, the program key and program end key is not deleted (step 608).

Exemplary Embodiment 2

A second embodiment of digital broadcast receiving apparatus of the invention is described below while referring to FIG. 7. In the following explanation, only the different points from the first embodiment are mainly described, and explanation of common parts are omitted.

In FIG. 7, the digital broadcast receiver 101 picks up digital audio and digital video data by same means as in the first embodiment.

The digital audio and digital video data of a program picked up by the receiver 101 are sent into the decoder 106 and scrambler 104.

The decoder 106 decodes the digital audio and/or digital video data when receiving or reproducing, converts into analog video and/or analog audio, and sends data to the data output judging unit 108 and decoded data output unit 107.

An apparatus individual key generator 701 generates a scramble key used when sending digital data to the memory device 113 and a descramble key used when reproducing, on the basis of the ID code stored in a detachable smart card (ID card) 703.

The scramble key and descramble key are generated by operating, for example, the ID code by exclusive OR of 10101010 in every byte, and are individually assigned in every apparatus.

A program key generator 702 generates a different program key for every program by using the time information mentioned in the received digital data, and the program key and the number of times of limited use of copy protection information received in the receiver 101 are stored in the smart card 703.

The scrambler 104 multiplexes the digital audio data and digital video data sent from the receiver 101 and the program key sent from the program key generator 702, and scrambles the multiplexed digital data by the scramble key from the apparatus individual key generator 701 and sends out the scrambled digital data to the data output judging unit 108.

The descrambler 105 descrambles the scrambled digital data sent from the digital data input and output unit 110 by the descramble key from the apparatus individual key generator 701, and picks up the program key and digital audio data and/or digital video data.

Furthermore, the descrambler 105 compares the program key picked up from the descrambled digital data, and the program key stored in the program key generator 702, and confirms the two keys are matched, and judges permission of reproduction by using the result of comparison and the number of times of limited use, and if reproduction is permitted, the descrambled digital data is transferred to the decoder 106.

The decoder 106, the decoded data output unit 107, data output judging unit 108, record judging unit 109, digital data input and output unit 110, and output data selector 111 are exactly same as in the first embodiment, and their description is omitted.

Moreover, the permission judging procedure of output of the digital data received in the digital broadcast receiver 101 into the memory device 113, the generation of program key and multiplexing process of generated keys and digital data, the scrambling process of multiplexed digital data, the data structure of multiplexed digital data, the permission judging procedure of output of reproduced digital data from the digital data memory device 113, and the updating procedure of the number of times of limited use and program key when reproducing are exactly same as in the first embodiment, and their description is omitted.

In the description of the first embodiment, the program key is set by including the time information, but not limited to this, program keys may be any others as far as they are different and not duplicate keys in every program, and, for example, sequential values increasing in every record may be used.

In a program limited in the number of times of use, the complement of the apparatus individual key is used as the scramble key and descramble key, but any other code may be used as far as different from the apparatus individual key, such as complement of 2, and moreover, in a program limited in the number of times of use, if the apparatus individual key same as the key as in the program not limited in the number of times of use is used as the scramble key and descramble key, the protection of copyright is effective although resistance to hacking is lower than in the embodiment.

The program division is shown as an interval of every 5 minutes, but the interval is not limited to 5 minutes, and other time intervals or non-uniform time intervals may be also set.

As the program end key and program key, 1 and 0 are added to the time information, but other codes may be also added as far as the program end key and program key can be distinguished as a pair.

In the scrambling process, the digital data is operated by the scramble key and exclusive OR, but scrambling process may be also executed by other logic operation or data exchange.

To distinguish a program not scrambled, a program scrambled but not limited in the number of times of use, and a program scrambled and limited in the number of times of use, 00, 01, and 10 are respectively set in the scramble bit 404, but the scramble bit 404 may have other bit pattern as far as the combination of bit patterns can be distinguished.

If a same scramble key is used in a program not limited in the number of times of use and a program limited in the number of times of use, a same bit pattern may be used in the scramble bit 404 in a program not limited in the number of times of use and a program limited in the number of times of use.

In the foregoing example, the scrambling position is right after the scramble bit 404 of the transport data 401, but the scrambling position is not limited to right after the scramble bit 404 as far as it is after the private data 405. However, if only the payload 403 is scrambled, the resistance to hacking is lower than in the embodiment, but the protection of copyright is effective.

The structure of data to be sent to the memory device 113 is explained in an example of transport data 401, but the data structure may be also a packet and/or pack of one or plural transport data 401.

The transport data composed of program key and program end key is mentioned in the private data 405, but without composing transport data, the program key and program end key may be directly written into the private data 405 of the digital data being processed, or one program key or program end key may be divided into, for example, several bits, and distributed in the private data 405 of plural pieces of transport data.

In the explanation of embodiment 2, the apparatus individual key is obtained by ID code in the smart card 703 and exclusive OR operation with the data of 10101010 in every byte, but this apparatus individual key may be obtained by other logic operation for determining one apparatus individual key from one ID code, or by using completely different data.

Thus, according to the invention, the scrambled video and audio data can be reproduced only in the received apparatus or can be reproduced by the specified times only in the received apparatus in the case of ordinary pay broadcast, and can be reproduced once only in the received apparatus in the case of pay-per-view, and in anyway the copyright can be protected.

Moreover, the copy protection control code which is the key of pay broadcast system is not issued outside of the receiving and reproducing apparatus, and therefore the resistance to hacking is high, and it is expected to realize a digital broadcast receiving and reproducing apparatus applicable not only to the digital VCR, but also to magnetic disk device, write once type magneto-optical disk device, and rewritable magneto-optical disk device.

What is claimed is:

1. A digital broadcast receiving and reproducing apparatus for receiving digital broadcast, demodulating digital data, and extracting analog signal and copy protection information from the digital data, comprising:

an apparatus individual key generator for generating an individual key for the receiving and reproducing apparatus; a program key generator for generating a program key corresponding to every received program and storing as a pair said program key and a number of times of limited use of said copy protection information; a scrambler for multiplexing said program key and said demodulated digital data and scrambling by said apparatus individual key; a record judging unit for judging permission of recording of said scrambled digital data; a digital data memory device for recording digital data; a descrambler for descrambling the scrambled digital data reproduced from said memory device by said apparatus individual key, extracting the program key from the descrambled digital data, and confirming the coincidence of the program key issued from the program key generator and the program key reproduced from the digital memory device; an output data selector for selecting the type of the data for issuing received digital data; and a use permission judging unit for judging permission to record digital data on the basis of the number of limited uses of digital data and the number of actual uses o the digital date, wherein said scrambler subtracts the number of uses of received digital data from the number of limited uses, and said descrambler subtracts one from the number of limited uses every time the digital data reproduced from the memory device is descrambled.

2. A digital broadcast recording and reproducing apparatus of claim 1, wherein said scrambler also has a function of dividing the received digital data into sections of specified size, and said program key generator generates a different program key in every one of said sections.

3. A digital broadcast recording and reproducing apparatus of claim 1, wherein said apparatus individual key is generated by using an ID code stored in a smart card, and said program key and said copy protection information are stored in said smart card when receiving said digital broadcast.

4. A digital broadcast recording and reproducing apparatus of claim 2, wherein said apparatus individual key is generated by using an ID code stored in a smart card, and said program key and said copy protection information are stored in said smart card when receiving said digital broadcast.

* * * * *